United States Patent
Ha et al.

(10) Patent No.: US 8,643,706 B2
(45) Date of Patent: Feb. 4, 2014

(54) DISPLAY APPARATUS AND CONTROL METHOD OF THE SAME

(75) Inventors: Tae-hyeun Ha, Suwon-si (KR); Hyung-rae Kim, Seoul (KR); Jung-jin Park, Seongnam-si (KR); Jae-sung Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 908 days.

(21) Appl. No.: 12/688,371

(22) Filed: Jan. 15, 2010

(65) Prior Publication Data

US 2010/0315494 A1 Dec. 16, 2010

(30) Foreign Application Priority Data

Jun. 16, 2009 (KR) .......................... 10-2009-0053224

(51) Int. Cl.
*H04N 13/04* (2006.01)
*H04N 9/47* (2006.01)
*G03B 21/00* (2006.01)
*G06F 3/038* (2013.01)
*G09G 5/00* (2006.01)
*G02B 27/26* (2006.01)

(52) U.S. Cl.
USPC ............... 348/53; 348/56; 353/122; 345/212; 345/629; 359/465

(58) Field of Classification Search
USPC ........................................................ 348/53
See application file for complete search history.

(56) References Cited

U.S. PATENT DOCUMENTS

| | | | | |
|---|---|---|---|---|
| 5,821,989 | A  * | 10/1998 | Lazzaro et al. | 348/56 |
| 2003/0169250 | A1 * | 9/2003 | Kimura | 345/212 |
| 2007/0035483 | A1 | 2/2007 | Chang | |
| 2007/0035707 | A1 * | 2/2007 | Margulis | 353/122 |
| 2007/0229395 | A1 | 10/2007 | Slavenburg et al. | |
| 2007/0229487 | A1 | 10/2007 | Slavenburg et al. | |

(Continued)

FOREIGN PATENT DOCUMENTS

| | | |
|---|---|---|
| EP | 2 015 589 A1 | 1/2009 |
| EP | 2 284 825 A1 | 2/2011 |

(Continued)

OTHER PUBLICATIONS

Communication dated Oct. 9, 2012, issued by the European Patent Office in counterpart European Patent Application No. 10154024.3.

*Primary Examiner* — Christopher S Kelley
*Assistant Examiner* — Hee-Yong Kim
(74) *Attorney, Agent, or Firm* — Sughrue Mion, PLLC (57) ABSTRACT

Provided are a display apparatus and a control method of the same. The display apparatus includes: an organic light emitting panel which alternately scans a left-eye image and a right-eye image in units of a frame; a signal transmitter which outputs a control signal to external shutter glasses to open or to close a left-eye shutter and a right-eye shutter of the shutter glasses; and a controller which controls the signal transmitter to make open and closed states of the left-eye shutter and the right-eye shutter be opposite to each other, and controls emission of the organic light emitting panel to display an image corresponding to an open shutter and not to display an image opposite to the open shutter when one of the left-eye shutter and the right-eye shutter is open.

14 Claims, 9 Drawing Sheets

(56) References Cited

U.S. PATENT DOCUMENTS

2007/0229951 A1* 10/2007 Jung et al. .................. 359/465
2007/0247477 A1* 10/2007 Lowry et al. ................ 345/629
2011/0032342 A1    2/2011 Kato et al.

FOREIGN PATENT DOCUMENTS

| KR | 10-2007-0098689 A | 10/2007 |
| WO | 2009/069026 A2 | 6/2009 |
| WO | 2010/082479 A1 | 7/2010 |

* cited by examiner

DISPLAY APPARATUS AND CONTROL METHOD OF THE SAME

CROSS-REFERENCE TO RELATED APPLICATION

This application claims priority from Korean Patent Application No. 10-2009-0053224, filed Jun. 16, 2009 in the Korean Intellectual Property Office, the disclosure of which is incorporated herein by reference in its entirety.

BACKGROUND

1. Field

Apparatuses and methods consistent with the inventive concept relate to a display apparatus and a control method of the same, and more particularly, to displaying a three-dimensional (3D) image and a control method of the same.

2. Description of the Related Art

A display apparatus processes various kinds of digital and/or analog video signals and displays an image. A user can view a 3D image based on a 3D video signal on a monitor, television (TV), or the like. The 3D video signal is divided into contents for a user's left eye and contents for a right eye, and the divided images are displayed for the left and right eyes, respectively.

According to a shutter glass method, the shutter glasses are turned on and off to alternately show left and right images so that a user can view the 3D image using the divided images corresponding to the left and right eyes.

While the left-eye image and the right-eye image are alternately displayed, an opening period of the shutter glasses may needs to be adjusted to prevent crosstalk generated when the left-eye image and the right-eye image are shown to a user at the same time.

Alternatively, to prevent crosstalk between the left-eye image and the right-eye image and to prevent an afterimage generated on the hold-type display panel, there may be used a control method of closing both the left-eye and right-eye shutters. However, this control method needs the state where both the shutters are closed in addition to two states of the left-eye and right-eye shutters described above (i.e., a case where the right-eye shutter is closed when the left-eye shutter is open, and a case where the right-eye shutter is open when the left-eye shutter is closed). It is, therefore, complicated to generate a control signal involving coding.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

According to one or more exemplary embodiments, there is provided a display apparatus which can display a 3-D image without crosstalk, and a control method of the same. Further, there is provided a display apparatus which can generate a control signal to be transmitted to shutter glasses, and a control method of the same.

According to an aspect of an exemplary embodiment, there is provided a display apparatus including: an organic light emitting panel which scans a left-eye image and a right-eye image alternately in units of a frame; a signal transmitter which outputs a control signal to external shutter glasses so that a left-eye shutter and a right-eye shutter of the shutter glasses can be open and closed; and a controller which controls the signal transmitter to make open and closed states of the left-eye shutter and the right-eye shutter be opposite to each other, and controls emission of the organic light emitting panel to display an image corresponding to an open shutter but not to display an image opposite to the open shutter when one of the left-eye shutter and the right-eye shutter is open.

The controller may control the organic light emitting panel to enter a non-emission state while the left-eye image or the right-eye image is scanned to the organic light emitting panel, and to enter an emission state while the left-eye image or the right-eye image is maintained after completely scanned.

An interval during which the left-eye image or the right-eye image is maintained may include a vertical blank interval.

The organic light emitting panel may includes a light emitting layer; a switching transistor receiving a data signal corresponding to an image; and a driving transistor connected to the switching transistor and a driving voltage source to which a driving voltage is applied, and allowing a current corresponding to the data signal to flow in the light emitting layer, and the controller may cut off the driving voltage from being applied to the driving transistor during the non-emission state.

The controller may controls the organic light emitting panel so that an emission area where an image corresponding to the open shutter is displayed can move from an upside to a downside of the organic light emitting panel, but the other areas except the emission area in the organic light emitting panel can enter a non-emission state.

The organic light emitting panel may include a light emitting layer; a switching transistor receiving a data signal corresponding to an image; a driving transistor connected to the switching transistor and a driving voltage source to which a driving voltage is applied, and allowing a current corresponding to the data signal to flow in the light emitting layer; and a current control transistor connected between the driving transistor and the light emitting layer and controlling a flow of a current, and the controller may control the current control transistor to prevent the current from flowing in the light emitting layer when a predetermined time elapses after the data signal is applied to the switching transistor.

A period during which the left-eye shutter or the right-eye shutter is open may be equal to a period during which the left-eye shutter or the right-eye shutter is closed.

A period during which the left-eye shutter or the right-eye shutter is open may be equal to a frame period.

According to another aspect of an exemplary embodiment, there is provided a display apparatus including: an organic light emitting panel which includes a light emitting layer; a signal transmitter which outputs a control signal so that a right-eye shutter of external shutter glasses can be closed when a left-eye shutter is open and the right-eye shutter is open when the left-eye shutter is closed; and a controller which controls the organic light emitting panel to enter a non-emission state where no image is displayed, when the left-eye image or the right-eye image opposite to the open shutter is scanned or maintained.

According to another aspect of an exemplary embodiment, there is provided a control method of a display apparatus including an organic light emitting panel which scans a left-eye image and a right-eye image alternately in units of a frame, the control method including: generating and outputting a control signal so that a left-eye shutter and a right-eye shutter of shutter glasses can be open and closed to be opposite to each other; and controlling emission of the organic light emitting panel to display an image corresponding to an open shutter but not to display an image opposite to the open shutter when one of the left-eye shutter and the right-eye shutter is open.

BRIEF DESCRIPTION OF THE DRAWINGS

The above and other aspects will become apparent by describing certain exemplary embodiments with reference to the accompanying drawings, in which.

DETAILED DESCRIPTION OF EXEMPLARY EMBODIMENTS

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the invention. However, the inventive concepts can be practiced without those specifically defined matters. Also, well-known functions or constructions are not described in detail since they would obscure the application with unnecessary detail.

Figure 1:
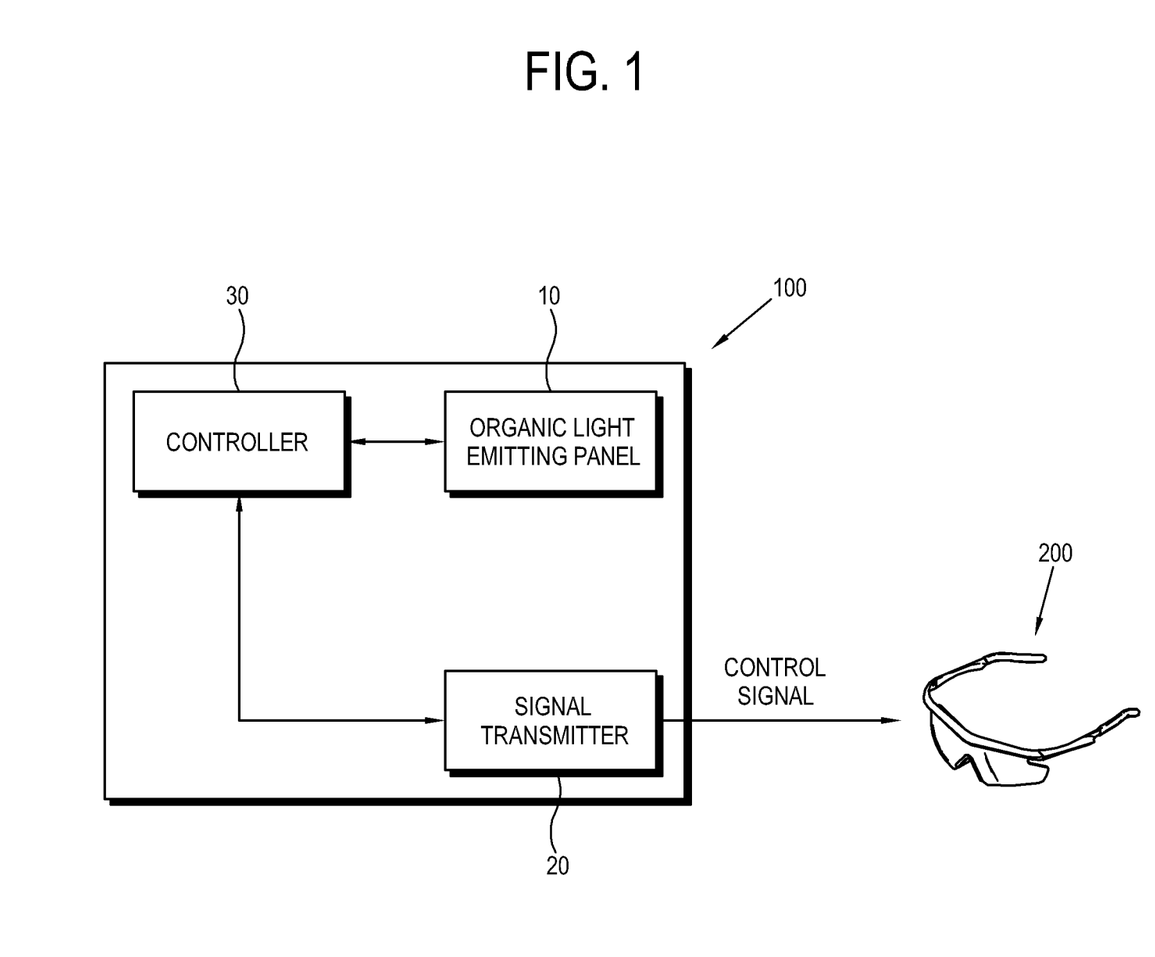
FIG. 1 is a control block diagram of a display apparatus according to an exemplary embodiment.

FIG. 1 is a control block diagram of a display apparatus according to an exemplary embodiment. As shown, a display apparatus 100 includes an organic light emitting panel 10 including a light emitting layer (not shown), a signal transmitter 20 outputting a control signal to external shutter glasses 200, and a controller 30 controlling the organic light emitting panel 10 and the signal transmitter 20. The display apparatus 100 in this exemplary embodiment may include a TV processing and displaying a broadcasting signal, a monitor connected to a computer, or a portable terminal such as a mobile phone. The display apparatus 100 may receive and display a two-dimensional (2D) video signal, i.e., a plane image signal, or may receive and display a 3D video signal, i.e., a solid image signal. The 3D video signal is divided according to a left-eye image for a user's left eye and a right-eye image for a user's right eye, and the divided images are sequentially and alternately displayed in units of a frame.

The organic light emitting panel 10 includes an organic light emitting layer made of an organic material, and corresponds to a self emission panel which can emit light by itself in response to a data signal corresponding to an image. Thus, the display apparatus 100 does not include a backlight assembly required for a liquid crystal display (LCD) panel. In this exemplary embodiment, the organic light emitting panel 10 is driven by a plurality of transistors included in respective pixels, and corresponds to a hold-type display panel where a once-received data signal is maintained until a data signal corresponding to the next frame is received. The organic light emitting panel 10 may have an oblong shape. Further, the data signals corresponding to one frame are sequentially scanned in a direction from top to bottom of the organic light emitting panel 10.

The signal transmitter 20 generates a control signal to alternately open a left-eye shutter and a right-eye shutter of the shutter glasses 200, and transmits the control signal to the shutter glasses 200. The left-eye image from the 3D video signal is shown to a user's left eye when the left-eye shutter is open, and the right-eye image is shown to a user's right eye when the right-eye shutter is open. The signal transmitter 20 may include an infrared transmitter. One of the left-eye shutter or the right-eye shutter is open if an infrared signal output as a control signal has intensity higher than a certain value, and the other one is open if the intensity of the infrared signal is lower than the certain value. The signal transmitter 20 may include a wired and/or wireless interface to communicate with the shutter glasses 200.

The shutter glasses 200 opens and closes the left-eye shutter and the right-eye shutter in synchronization with the control signal output from the signal transmitter 20. The shutter glasses 200 may include a liquid crystal shutter.

The controller 30 controls the signal transmitter 20 so that the open/closed states of the left-eye shutter and the right-eye shutter are reversed in relation to one another. In this exemplary embodiment, the shutter glasses 200 is configured so that the right-eye shutter is closed when the left-eye shutter is open and the right-eye shutter is open when the left-eye shutter is closed. That is, the open/closed states of the left-eye shutter and the right-eye shutter are reversed in relation to one another, and the shutters are not both open or closed. In this exemplary embodiment, a period during which the shutter is open is equal to that during which the shutter is closed. That is, the shutter is open for a certain time period and closed for the same certain time period. Thus, the shutter alternates between the open state and the closed state. In this exemplary embodiment, the certain time period is a frame period T during which one frame is formed.

The controller 30 controls emission of the organic light emitting panel 10 to display an image corresponding to the open shutter and not to display an image opposite to the open shutter when one of the left-eye shutter and the right-eye shutter is open. As described above, data signals corresponding to an image are sequentially scanned to the organic light emitting panel 10. However, if the emission is cut off by the controller 30, the organic light emitting panel 10 displays no image and thus has an effect as if a black signal is received. An emission state where an image is displayed may be maintained during a certain time period, and a non-emission state where an image is not displayed may be maintained during another certain time period. Alternatively, a certain part of the organic light emitting panel 10 may emit light, while the other part may emit no light. That is, the controller 30 controls the shutter glasses 200 to be open in response to a control signal, and controls the organic light emitting panel 10 not to emit light if an image opposite to the open shutter is scanned or maintained, thereby preventing crosstalk of an image.

The controller 30 includes a video signal processor (not shown) to generate a data signal corresponding to an image, and applies various kinds of signals including the data signal to the organic light emitting panel 10, to drive the organic light emitting panel 10. Software and hardware configurations for performing functions of the controller 30 are described in known technology.

Figure 2:
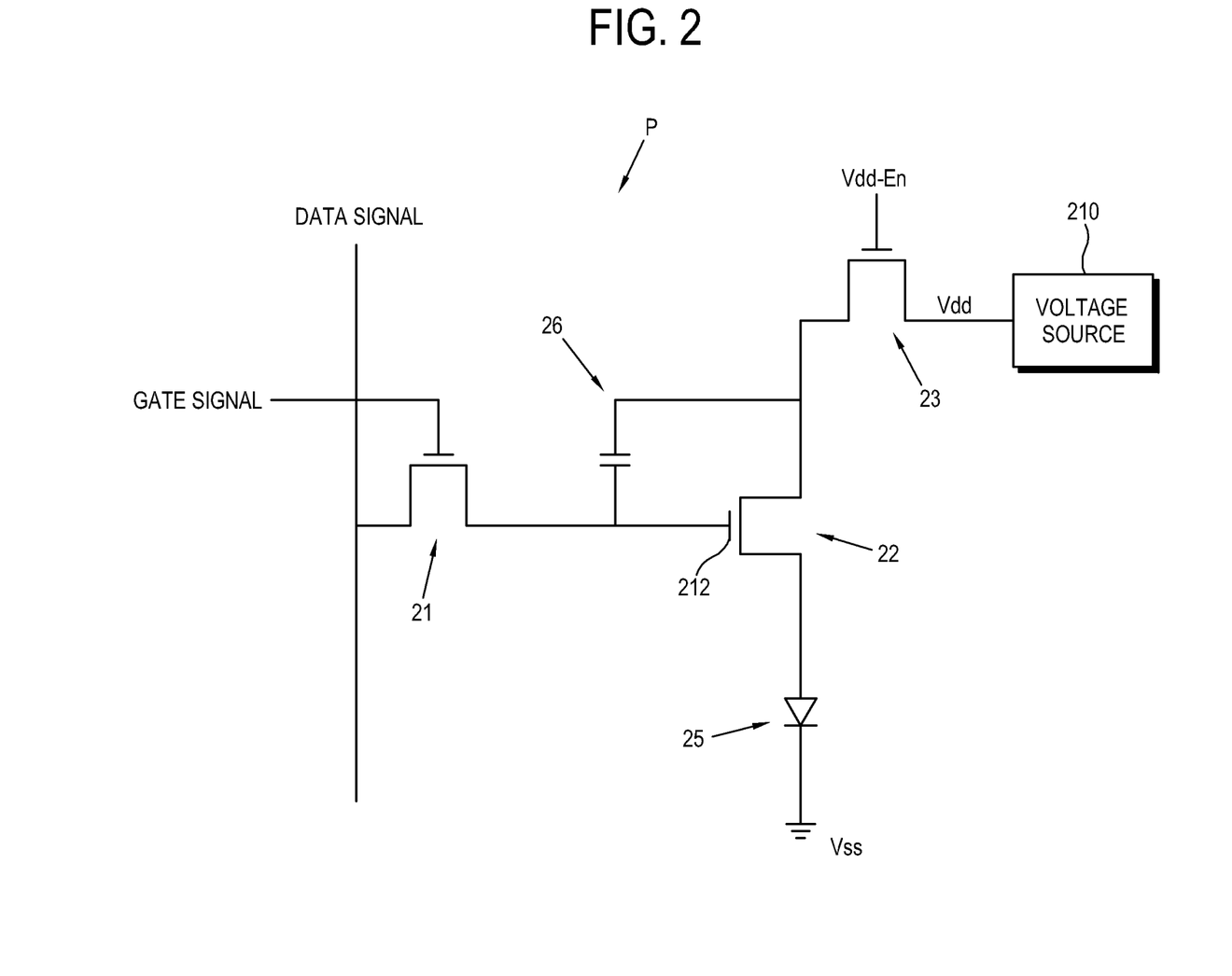
FIG. 2 is an equivalent circuit diagram of a pixel in an organic light emitting panel according to an exemplary embodiment.
Figure 3A:
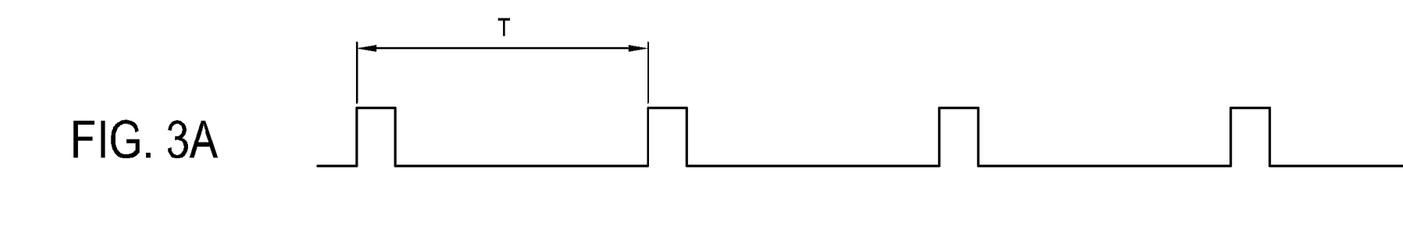
FIGS. 3A, 3B, 3C, 3D, and 3E show signal waveforms according to an exemplary embodiment.
Figure 3B:
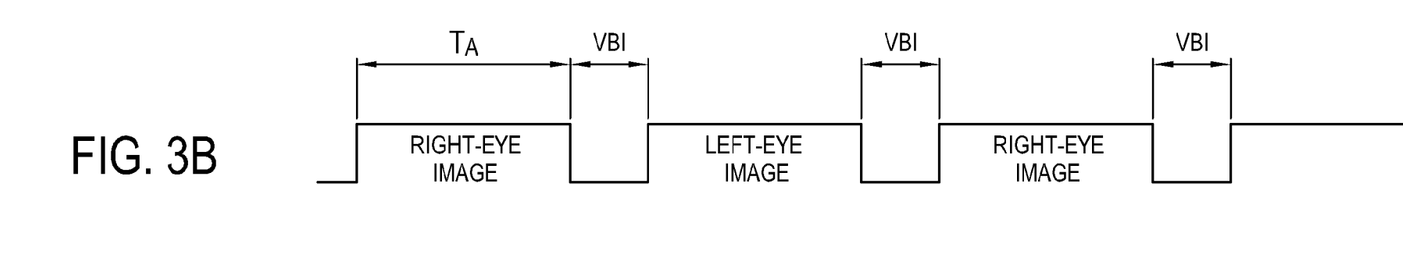
Figure 3C:
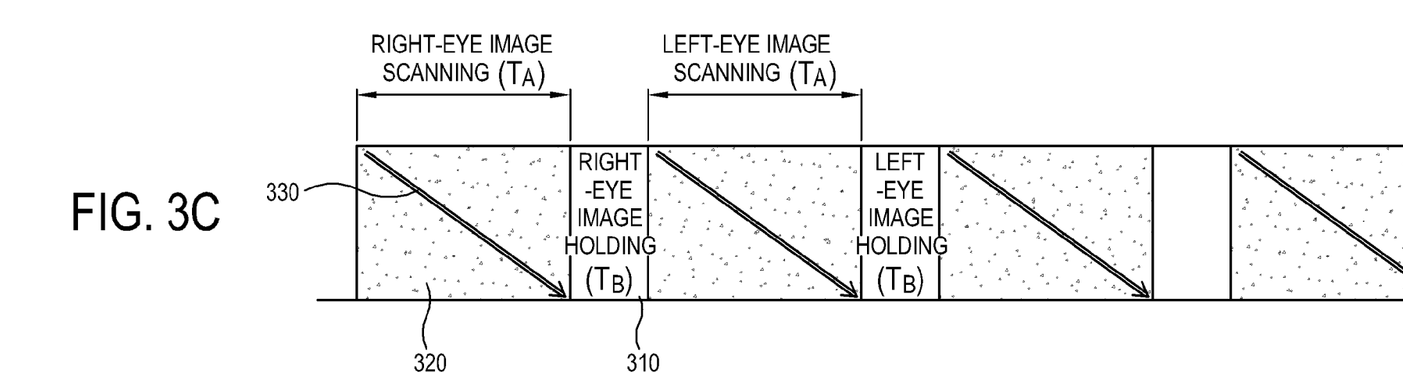
Figure 3D:
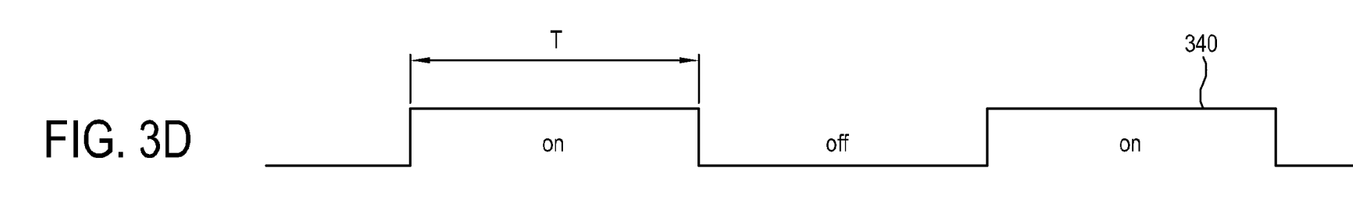
Figure 3E:
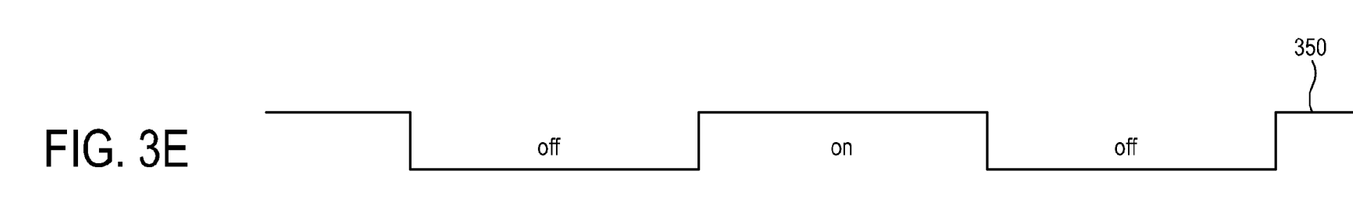
Figure 4:
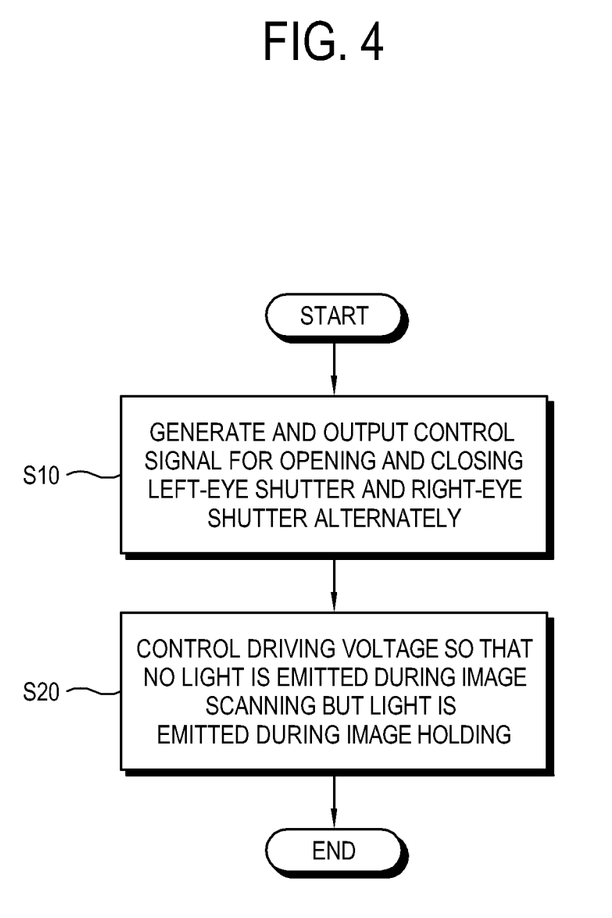
FIG. 4 is a control flowchart for explaining a control method according to an exemplary embodiment.

FIGS. 2 through 4 are views for explaining a control method according to an exemplary embodiment of the display apparatus of FIG. 1. FIG. 2 is an equivalent circuit diagram of a pixel in an organic light emitting panel according to an exemplary embodiment of the display apparatus of FIG. 1, FIGS. 3A to 3E show signal waveforms according to an exemplary embodiment of the display apparatus of FIG. 1, and FIG. 4 is a control flowchart for explaining a control method according to an exemplary embodiment of the display apparatus of FIG. 1.

As shown in FIG. 2, a pixel P of the organic light emitting panel 10 includes a plurality of signal lines and a plurality of transistors 21, 22, and 23 to apply a plurality of signals. Each pixel P includes a switching transistor 21 to receive a data signal corresponding to an image and a light emitting layer 25. A driving transistor 22 is connected to the switching transistor 21 and a driving voltage source 210. A driving voltage Vdd is applied to the driving transistor 22 and a current corresponding to the data signal flows in the light emitting layer 25. Additionally, the pixel P includes a capacitor 26 connected between the driving voltage source 210 and a gate electrode 212 of the driving transistor 22 and charged with voltage corresponding to a data signal. A control transistor 23 is connected between the driving voltage source 210 and the driving transistor 22 to cut off the supply of the driving voltage Vdd.

To be brief, the pixel P is driven as follows. When a gate signal is applied to the switching transistor 21, the switching transistor 21 is turned on to apply the data signal to the pixel P. The data signal charges the capacitor 26, and turns on the driving transistor 22. The current flowing in the light emitting layer 25 formed between the driving voltage Vdd and the ground Vss is controlled according to the voltage charged in the capacitor 26. The light emitting layer 25 is a current control device which controls light emission depending on the amount of the current. When the control transistor 23 is turned off and the driving voltage Vdd is not applied to the driving transistor 22, the driving transistor 22 is not driven and no current flows in the light emitting layer 25. The controller 30 applies an enable signal Vdd-En to control the driving voltage Vdd as a gate signal to the control transistor 23. When the controller 30 transmits the enable signal Vdd-En to the control transistor 23, the driving voltage Vdd is applied to the driving transistor 22 and the light emitting layer 25 emits light. That is, the light emitting layer 25 enters the emission state. When the enable signal Vdd-En is disabled, the light emitting layer 25 enters the non-emission state.

In this exemplary embodiment, the controller 30 controls the organic light emitting panel 10 to enter the non-emission state where no image is displayed while the left-eye or right-eye image corresponding to one frame is scanned on the organic light emitting panel 10, and controls the organic light emitting panel 10 to enter the emission state while the completely scanned left-eye or right-eye image is maintained. To enter the non-emission state, the controller 30 controls the control transistor 23 not to apply the driving voltage Vdd to the driving transistor 22 while an image is scanned.

Referring to FIG. 3A, an image corresponding to one frame is distinguished by a vertical synchronous signal 300 per frame period T. As shown in FIG. 3B, the frame period T includes a scanning interval $T_A$ where a 3D video signal 302 is applied to the organic light emitting panel 10, and a vertical blank interval (VBI) $T_B$ where the scanned image is maintained. FIG. 3C shows an image display state of the organic light emitting panel 10, i.e., the emission state 310 and non-emission state 320 of the organic light emitting panel 10 when an image corresponding to one frame is scanned. The image is scanned in units of a row in a direction 330 from top to bottom of the organic light emitting panel 10, i.e., applied to the organic light emitting panel 10 while increasing the number of vertical lines of the organic light emitting panel 10. In FIG. 3C, a horizontal axis indicates time, and a vertical axis indicates the vertical line of the organic light emitting panel 10. As shown in FIG. 3C, the controller 30 controls the control transistor 23 to make the organic light emitting panel 10 enter the non-emission state 320 during the scanning interval $T_A$ where the right-eye image is scanned from top to bottom, in the direction 330, of the organic light emitting panel 10, and then enter the emission state 310 where the driving voltage Vdd is applied during the VBI, i.e., a maintaining or holding interval $T_B$ after the right-eye image is completely scanned. The data signal charged in the capacitor 26 during the scanning interval $T_A$ is displayed on the organic light emitting panel 10 during the maintaining interval $T_B$. After the right-eye image is displayed, the left-eye image is scanned and displayed by the like process.

Referring to FIGS. 3D and 3E, a graph 340 and a graph 350 represent states of the right-eye shutter and the left-eye shutter, respectively, that are opposite to each other. One of the right-eye shutter and the left-eye shutter is open (on) during the frame period T and closed (off) during the next frame period T. Thus, a user can view only the right-eye image because the emission state is made only after the right-eye image is completely scanned and then maintained. The same is true for the left-eye image. Further, a user cannot view any image generated when the right-eye and left-eye images are overlapped since the non-emission state is maintained while the right-eye and left-eye images are scanned, i.e., while the right-eye and left-eye images are formed corresponding to one frame. In other words, a user views only the right-eye image when the right-eye shutter is open, and only the left-eye image when the left-eye shutter is open. These images are repeated to show the 3D image.

To allow a user to view an image for a sufficiently long time, a maintaining interval $T_B$ may be made long enough for an image to be maintained. Here, the length of the maintaining interval $T_B$ may be properly set depending on the size, panel driving speed, etc., of the organic light emitting panel 10. For example, about 10% to 40% of the frame period may be set as the maintaining interval $T_B$. The controller 30 may include devices other than the control transistor 23 to cut off the driving voltage Vdd, and may cut off the driving voltage Vdd by using the software. Whether the foregoing transistor will be turned on or off may vary depending on the type of the transistor. Also, the high/low of the waveform is not limited to the foregoing description.

Referring to FIG. 4, a control method of the display apparatus of an exemplary embodiment is described.

At operation S10, the controller 30 controls the signal transmitter 20 to generate and output a control signal for alternately opening/closing the left-eye shutter and the right-eye shutter to be opposite to each other.

At operation S20, the controller 30 cuts off the supply of the driving voltage Vdd so that the organic light emitting panel 10 does not emit light while the left-eye or right-eye image is scanned on to the organic light emitting panel 10, and maintains the supply of the driving voltage Vdd so that the organic light emitting panel 10 emits light while the completely scanned image is maintained.

Figure 5:
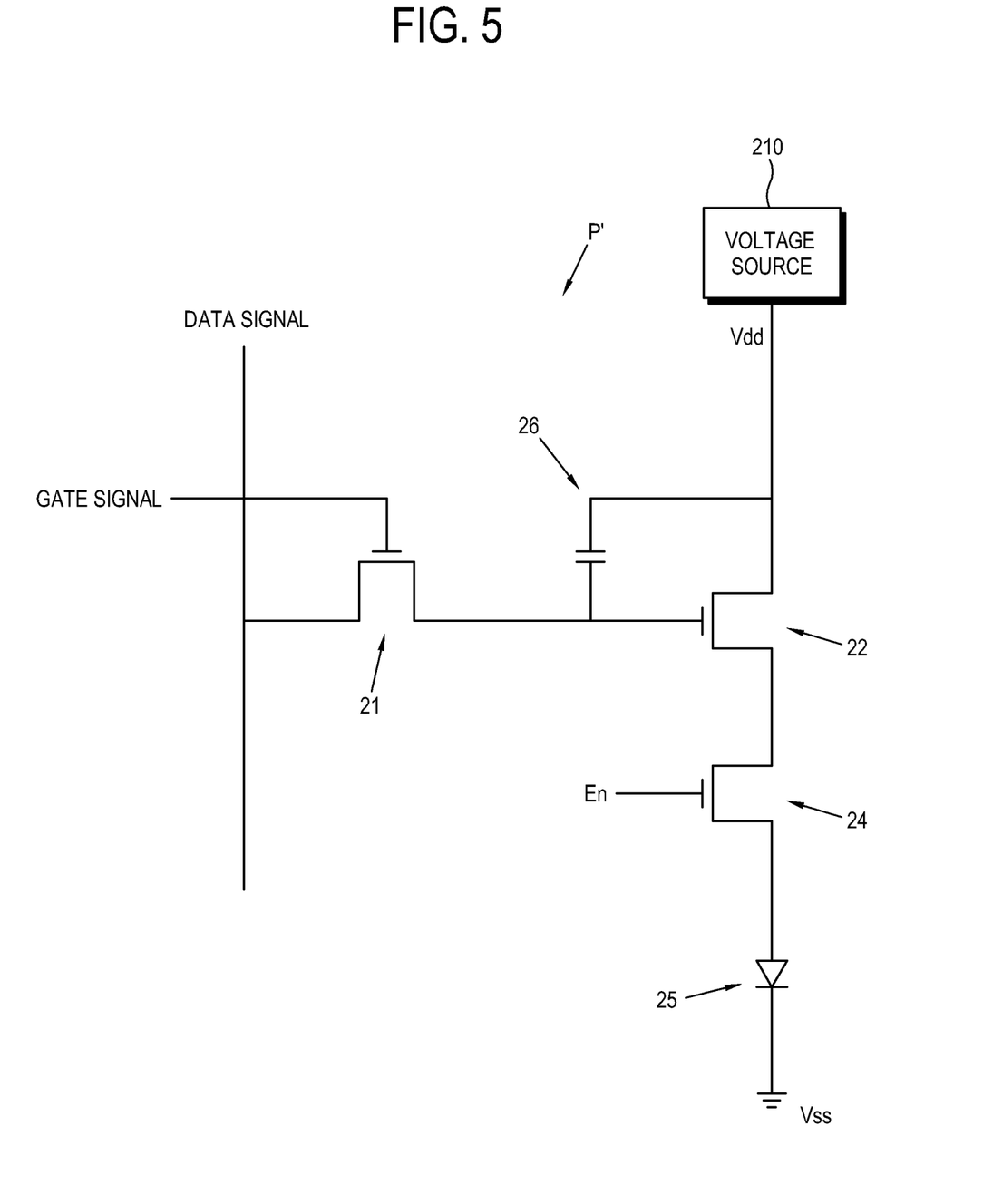
FIG. 5 is an equivalent circuit diagram of a pixel in an organic light emitting panel according to another exemplary embodiment.
Figures 6A, 6B:
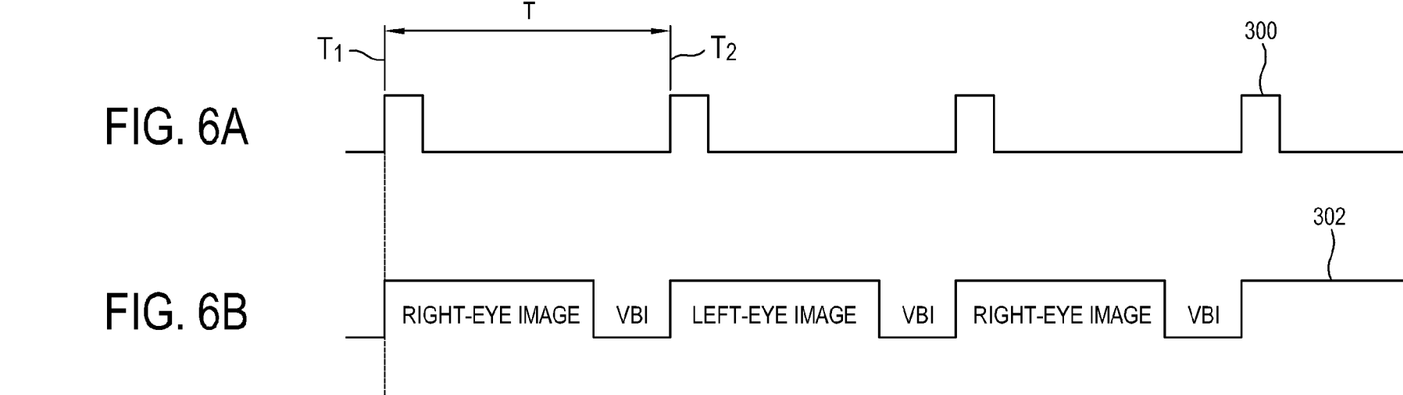
FIGS. 6A, 6B, 6C, 6D, and 6E show signal waveforms according to another exemplary.
Figure 6C:
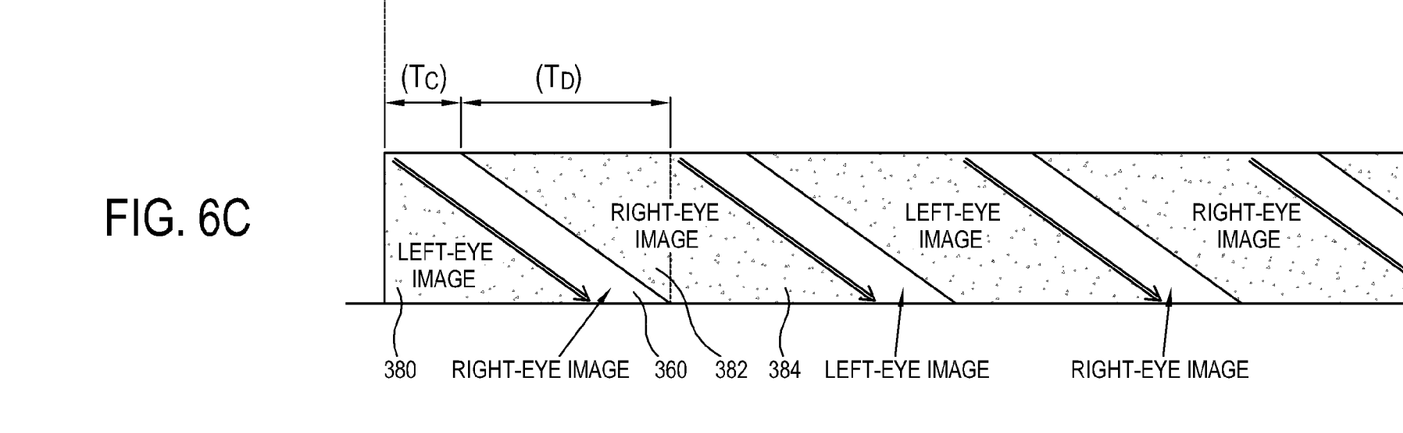
Figure 6D:
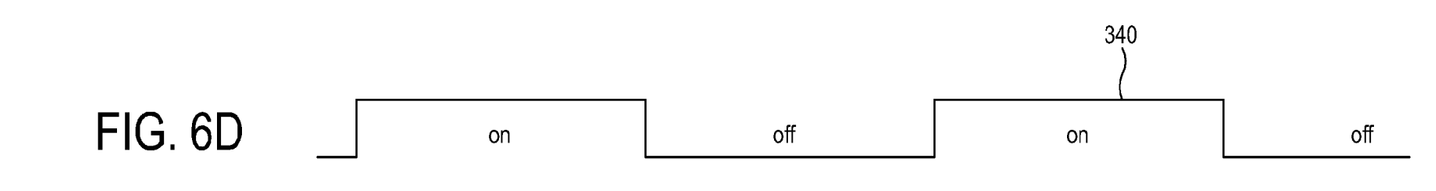
Figure 6E:
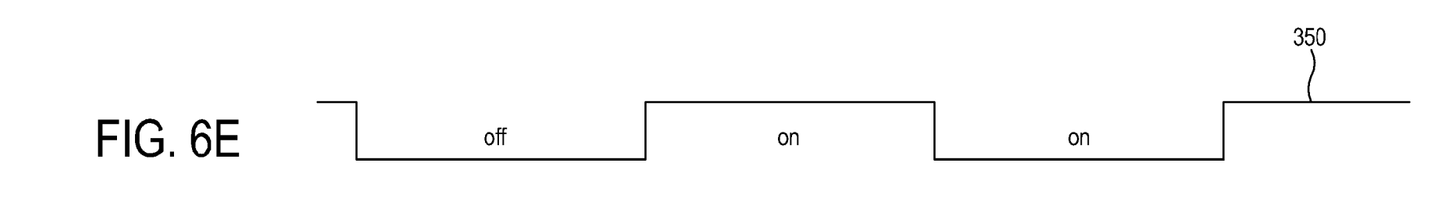
Figure 7:
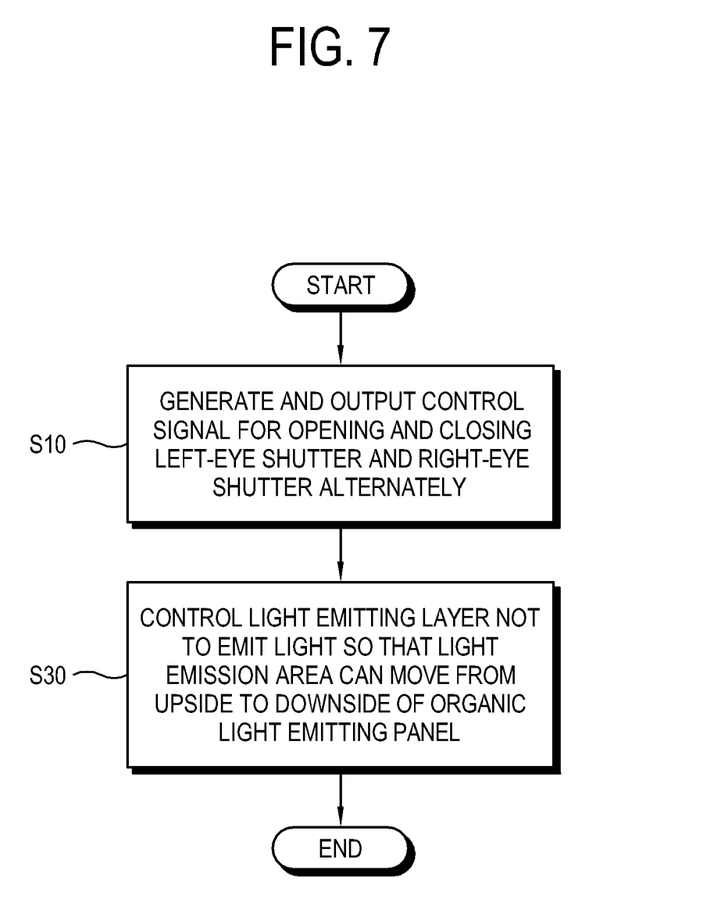
FIG. 7 is a control flowchart for explaining a control method according to another exemplary embodiment.

FIGS. 5 through 7 are views for explaining a control method according to another exemplary embodiment of the display apparatus of FIG. 1. FIG. 5 is an equivalent circuit diagram of a pixel P' in an organic light emitting panel 10 according to an exemplary embodiment of the display apparatus of FIG. 1, FIGS. 6A to 6E show signal waveforms, and FIG. 7 is a control flowchart for explaining the control method.

As shown in FIG. 5, the pixel P' includes a control transistor 24 connected between the driving transistor 22 and the light emitting layer 25 to control flow of current. When the control transistor 24 is turned off, the current does not flow in the light emitting layer 25, thereby cutting off the emission.

The data signal corresponding to the current frame is applied and maintained until a data signal corresponding to the next frame is applied, so that light of the data signal corresponding to the current frame is continuously emitted during one frame. In this exemplary embodiment, if a predetermined time elapses after applying the data signal to the switching transistor 21, the controller 30 controls the control transistor 24 to prevent the emission for the maintained data signal. That is, the controller 30 controls an enable signal En to prevent the current from flowing in the light emitting layer 25 after applying the data signal, thereby turning off the control transistor 24.

As shown in FIGS. 6A to 6E, the left-eye shutter and the right-eye shutter are open at a point of time $T_1$ when a 3D video signal 302 corresponding to one frame is applied to the organic light emitting panel 10, and closed at a point of time $T_2$ when an image corresponding to the next frame is applied to the organic light emitting panel 10. That is, the shutters are repetitively open and closed in synchronization with the vertical synchronous signal 300. When an emission period $T_C$ elapses after an image is applied to the organic light emitting panel 10, the controller 30 controls the control transistor 24 to prevent the current from flowing in the light emitting layer 25 during a non-emission period $T_D$. As shown in FIG. 6C, since the image is scanned from top to bottom of the organic light emitting panel 10 in a direction of sequentially increasing the number of vertical lines, it is shown as if an emission area 360 in which the image is displayed moves from top to bottom of the organic light emitting panel 10. That is, only the emission area 360 corresponding to a partial image of the current frame enters the area 382 corresponding to an image of the current frame after a lapse of a predetermined time enter the non-emission state. Accordingly, the left-eye image 380 of the previous frame is not shown when the right-eye shutter 340 is open, and the right-eye image 384 of the previous frame is not shown when the left-eye shutter 350 is open. As the speed of applying an image to the organic light emitting panel 10 increases, the emission time $T_C$ becomes longer.

Referring to FIG. 7, a control method of the display apparatus in this exemplary embodiment is as follows. Similarly to the exemplary embodiment of FIG. 4, first, at operation S10, the controller 30 controls the signal transmitter 20 to generate and output a control signal for alternately opening and closing the left-eye shutter and the right-eye shutter to be opposite to each other. In this exemplary embodiment, the shutter is open and closed in synchronization with the vertical synchronous signal.

At operation S30, the controller 30 cuts off the emission of the light emitting layer 25 so that the emission area, where the left-eye image or the right-eye image is displayed while the left-eye shutter or the right-eye shutter is open, moves from top to bottom of the organic light emitting panel 10. That is, the controller 30 controls the control transistor 24 after a lapse of a predetermined emission time $T_C$ after an image is scanned to prevent the current from flowing in the light emitting layer 25. Here, only the emission area corresponding to a partial image corresponding to the open shutter is displayed, and the other areas except the emission area enter the non-emission state.

The display apparatus according to an exemplary embodiment displays the 3D video signal through the organic light emitting panel 10 having the light emitting layer. The shutter glasses 200 are driven by an algorithm to alternately open and close the shutters to be in a state opposite to each other. The transistors 23 and 24 formed in the organic light emitting panel 10 are controlled to achieve the non-emission state. That is, the emission state is controlled without inserting a black image or the like data signal change, thereby cutting off the image opposite to the open shutter.

As described above, there are provided a display apparatus which can display a 3-D image without a crosstalk, and a control method of the same.

Also, there are provided a display apparatus which can generate a control signal to be transmitted to shutter glasses, and a control method of the same.

The foregoing exemplary embodiments and advantages are merely exemplary and are not to be construed as limiting the inventive concepts. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   an organic light emitting panel which alternately scans a left-eye image and a right-eye image in units of a frame;
   a signal transmitter which outputs a control signal to external shutter glasses to open or to close a left-eye shutter and a right-eye shutter of the external shutter glasses; and
   a controller which controls the signal transmitter to make open and closed states of the left-eye shutter and the right-eye shutter to be opposite to each other, and controls emission of the organic light emitting panel to display an image corresponding to an open shutter and not to display an image opposite to the open shutter when one of the left-eye shutter and the right-eye shutter is open,
   wherein the controller controls the organic light emitting panel to be in a non-emission state while the left-eye image or the right-eye image is being scanned to the organic light emitting panel, and be in an emission state while the left-eye image or the right-eye image is maintained after being completely scanned.

2. The display apparatus according to claim 1, wherein an interval during which the left-eye image or the right-eye image is maintained comprises a vertical blank interval.

3. The display apparatus according to claim 2, wherein the organic light emitting panel comprises:
   a light emitting layer;
   a switching transistor which receives a data signal corresponding to an image;
   a driving voltage source to supply a driving voltage; and
   a driving transistor connected to the switching transistor and the driving voltage source to receive the driving voltage so that a current corresponding to the data signal flows in the light emitting layer,
   wherein the controller cuts off the driving voltage from being supplied to the driving transistor during the non-emission state.

4. The display apparatus according to claim 1, wherein the controller controls the organic light emitting panel so that an emission area in which an image corresponding to the open shutter is displayed moves from top to bottom of the organic light emitting panel, and other areas excluding the emission area in the organic light emitting panel be in a non-emission state.

5. The display apparatus according to claim 4, wherein the organic light emitting panel comprises:
   a light emitting layer;
   a switching transistor which receives a data signal corresponding to an image;
   a driving voltage source to supply a driving voltage;
   a driving transistor connected to the switching transistor and the driving voltage source to receive the driving voltage so that a current corresponding to the data signal flows in the light emitting layer; and
   a control transistor connected between the driving transistor and the light emitting layer to control a flow of the current,
   wherein the controller controls the control transistor to prevent the current from flowing in the light emitting layer after a lapse of a predetermined time after the data signal is applied to the switching transistor.

6. The display apparatus according to claim 1, wherein a time period during which the left-eye shutter or the right-eye shutter is open is equal to a time period during which the left-eye shutter or the right-eye shutter is closed.

7. The display apparatus according to claim 6, wherein the time period during which the left-eye shutter or the right-eye shutter is open is equal to a frame period.

8. A display apparatus comprising:
   an organic light emitting panel which comprises a light emitting layer;
   a signal transmitter which outputs a control signal so that a right-eye shutter of external shutter glasses is closed when a left-eye shutter is open and the right-eye shutter is open when the left-eye shutter is closed; and
   a controller which controls the organic light emitting panel to be in a non-emission state in which no image is displayed, when a left-eye image or a right-eye image opposite to an open shutter is being scanned.

9. A control method for a display apparatus including an organic light emitting panel which alternately scans a left-eye image and a right-eye image in units of a frame, the control method comprising:
   generating and outputting a control signal to open or to close a left-eye shutter and a right-eye shutter of shutter glasses alternately to one another; and
   controlling emission of the organic light emitting panel to display an image corresponding to an open shutter and not to display an image opposite to the open shutter when one of the left-eye shutter and the right-eye shutter is open,
   wherein the controlling the emission comprises controlling the organic light emitting panel to be in a non-emission state while the left-eye image or the right-eye image is being scanned to the organic light emitting panel, and be in an emission state while the left-eye image or the right-eye image is maintained after being completely scanned.

10. The control method according claim 9, wherein the organic light emitting panel comprises a light emitting layer, a switching transistor receiving a data signal corresponding to an image, a driving voltage source to supply a driving voltage, and a driving transistor connected to the switching transistor and the driving voltage source to receive the driving voltage so that a current corresponding to the data signal flows in the light emitting layer, and
   the controlling the emission comprises cutting off the driving voltage from being applied to the driving transistor during the non-emission state.

11. The control method according to claim 9, wherein the controlling the emission comprises controlling an emission area in which the left-eye image or the right-eye image is displayed while the left-eye shutter or the right-eye shutter is open to move from top to bottom of the organic light emitting panel, and
   controlling other areas excluding the emission area in the organic light emitting panel to be in a non-emission state.

12. The control method according to claim 11, wherein the organic light emitting panel comprises a light emitting layer, a switching transistor receiving a data signal corresponding to an image, a driving voltage source to supply a driving voltage, and a driving transistor connected to the switching transistor and the driving voltage source to receive the driving voltage so that a current corresponding to the data signal flows in the light emitting layer, and a control transistor connected between the driving transistor and the light emitting layer and controlling a flow of a current, and
   the controlling the emission of the organic light emitting panel comprises controlling the control transistor to prevent the current from flowing after a lapse of a predetermined time after the data signal is applied to the switching transistor.

13. A display apparatus comprising:
   an organic light emitting panel which alternately scans a left-eye image and a right-eye image in units of a frame, based on a synchronization signal; and
   a controller which controls a left-eye shutter and a right-eye shutter of shutter glasses to be in opposite states in which one of the left-eye shutter and the right-eye shutter is open while another one of the left-eye shutter and the right-eye shutter is closed, wherein an image corresponding to an open shutter is displayed only when the corresponding shutter is open,
   wherein the organic light emitting panel has a non-emission state during which one of the left-eye image and the right-eye image is being scanned and an emission state in which one of the left-eye image and the right-eye image is maintained after being completely scanned, while the corresponding shutter is open.

14. The display apparatus according to claim 13, wherein the organic light emitting panel has an emission area in which the image corresponding to the open shutter is displayed, and non-emission areas which exclude the emission area.

* * * * *